United States Patent
Iwao

(10) Patent No.: US 10,859,513 B2
(45) Date of Patent: Dec. 8, 2020

(54) OBLIQUE CT APPARATUS

(71) Applicant: SHIMADZU CORPORATION, Kyoto (JP)

(72) Inventor: Yoshihiko Iwao, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 200 days.

(21) Appl. No.: 16/062,446

(22) PCT Filed: Dec. 15, 2015

(86) PCT No.: PCT/JP2015/085069
§ 371 (c)(1),
(2) Date: Oct. 24, 2018

(87) PCT Pub. No.: WO2017/103995
PCT Pub. Date: Jun. 22, 2017

(65) Prior Publication Data
US 2019/0049394 A1    Feb. 14, 2019

(51) Int. Cl.
*G01N 23/046* (2018.01)
*G01N 23/04* (2018.01)
(Continued)

(52) U.S. Cl.
CPC .......... *G01N 23/046* (2013.01); *G01N 23/04* (2013.01); *G01N 2223/33* (2013.01);
(Continued)

(58) Field of Classification Search
CPC combination set(s) only.
See application file for complete search history.

(56) References Cited

U.S. PATENT DOCUMENTS

| 6,178,220 | B1 * | 1/2001 | Freundlich ............ G06T 11/003 378/15 |
| 6,320,929 | B1 * | 11/2001 | Von Der Haar ....... A61B 6/032 378/15 |

(Continued)

FOREIGN PATENT DOCUMENTS

| CN | 103940835 A | 7/2014 |
| JP | 2001-286458 A | 10/2001 |

(Continued)

OTHER PUBLICATIONS

International Search Report for PCT/JP2015/085069 dated Mar. 1, 2016 [PCT/ISA/210].

(Continued)

*Primary Examiner* — Christine S. Kim
(74) *Attorney, Agent, or Firm* — Sughrue Mion, PLLC

(57) ABSTRACT

When performing CT imaging while maintaining a state in which a rotational axis Ax and an irradiation axis (optical axis) intersect obliquely, the X-ray CT apparatus 1 of the present invention can make assessments from a group of cross-sectional images resulting from provisional CT imaging, so even an unskilled person can determine a specific cross-sectional image with high precision, and can further determine the CT imaging conditions so that the cross-sectional image is positioned in the center. In addition, by performing main imaging by narrowing the target field from provisional CT imaging, CT imaging can be performed without the portion to be viewed deviating from the field of view. As a result, the operator can perform CT imaging without repeating a process of trial and error involving performing CT imaging while changing the CT imaging conditions, and CT imaging can be performed efficiently without requiring skill.

3 Claims, 11 Drawing Sheets

(51) Int. Cl.
*G06F 3/0484* (2013.01)
*G06F 3/0482* (2013.01)

(52) U.S. Cl.
CPC ........ *G06F 3/0482* (2013.01); *G06F 3/04845* (2013.01); *G06F 3/04847* (2013.01)

(56) References Cited

U.S. PATENT DOCUMENTS

| | | | |
|---|---|---|---|
| 6,819,736 B1 * | 11/2004 | Bruder | A61B 6/032 378/15 |
| 7,103,134 B2 * | 9/2006 | Suzuki | A61B 6/032 378/4 |
| 9,476,844 B2 * | 10/2016 | Tagawa | G06T 11/005 |
| 2006/0013354 A1 * | 1/2006 | Heismann | A61B 6/032 378/4 |
| 2014/0205058 A1 | 7/2014 | Tagawa | |

FOREIGN PATENT DOCUMENTS

| | | |
|---|---|---|
| JP | 2009022398 A | 2/2009 |
| JP | 2014-139533 A | 7/2014 |
| JP | 2015000322 A | 1/2015 |

OTHER PUBLICATIONS

Communication dated May 9, 2019, from the Japanese Patent Office in counterpart Application No. 2017-555903.
Communication dated May 27, 2020, from the State Intellectual Property Office of the P.R. of China in Application No. 201580085805.3.

* cited by examiner

OBLIQUE CT APPARATUS

CROSS REFERENCE TO RELATED APPLICATIONS

This application is a National Stage of International Application No. PCT/JP2015/085069, filed on Dec. 15, 2015.

TECHNICAL FIELD

The present invention relates to an oblique CT apparatus for performing CT (Computed Tomography) imaging.

BACKGROUND ART

CT apparatuses can be broadly divided into a type known as orthogonal CT and type known as oblique CT or planar CT (PCT: Planar Computed Tomography). An X-ray CT apparatus may be give as an example of a CT apparatus, and in an orthogonal type of apparatus, a rotational axis around which an object (work) is driven to rotate and a irradiation axis connecting the centers of an X-ray source (for example, an X-ray tube) and an X-ray detector are orthogonal. In contrast, in an apparatus called an oblique CT, the rotational axis and the irradiation axis (optical axis) are not orthogonal, but rather intersect obliquely (for example, see Patent Document 1).

In comparison to an oblique CT apparatus, an orthogonal type apparatus can achieve a clear image with little distortion, but there is a drawback in that it is difficult to photograph a plate-shaped work such as a mounting substrate in a magnified view. In a mounting substrate, for example, when photographing very fine structures such as a Ball Grid Array (BGA) or wiring, it is necessary to photograph the structures while keeping the X-ray tube and the mounting substrate in close proximity. However, since the mounting substrate has a wide shape in the planar direction, there is a risk that the X-ray tube and the mounting substrate may interfere with one another. As a result, to avoid interference, it is not possible to photograph the structures while keeping the X-ray tube and the mounting substrate in close proximity, and it is thus difficult to photograph a plate-shaped work such as a mounting substrate in a magnified view. In contrast, an oblique CT apparatus is suitable for observing a plate-shaped work in a magnified view, and is often used for the monitoring of such a mounting substrate or the like.

In CT imaging, it is typically possible to obtain a plurality of cross-sectional images (group of cross-sectional images) along the rotational axis direction in one shot. Here, the stage on which the work is mounted is a horizontal plane, and the rotational axis is orthogonal to the stage in the form of a horizontal plane, so the rotational axis becomes a vertical axis. Accordingly, each position of the group of cross-sectional images along the rotational axis direction is referred to as the "height" in this specification. In the case of an orthogonal type CT apparatus, the portion appearing in the center of a projected image (fluoroscopic image) is located in the center of the group of cross-sectional images obtained by CT imaging, so adjustments in the height direction can be made easily.

In contrast, it is difficult to make adjustments in the height direction with an oblique CT apparatus, and to ensure that the position to be imaged is reflected correctly, it is necessary to adjust a parameter called the "focus point height." Here, as illustrated in FIG. 15, the focus point height refers to a given height h (of a position to be viewed) in a region $D_2$ when the region appearing in the fluoroscopic image is defined as $D_1$ and the region appearing in the fluoroscopic image from any angle over a range of 360° is defined as $D_2$. Note that in practice, in contrast to FIG. 15, there is also lateral expansion in the X-ray detector, so it should be noted that the region $D_2$ assumes a complex shape such as a piece drawn in three dimensions with the upper portion recessed. When outputting a region wider than the region $D_2$, the region outside the region $D_2$ does not appear in the fluoroscopic image at some angles over a range of 360°, but a CT image (cross-sectional image) can also be created for this region, even if incomplete.

In a CT apparatus, imaging is performed while the X-ray source and the X-ray detector rotate relatively over a range of 360° with respect to the work, but any region including a portion of the region reflected in the fluoroscopic region from any angle over a range of 360° as described above (see symbol $D_2$ in FIG. 15) becomes a region which is outputted as the final group of cross-sectional images. In addition, a plane including a point which does not move from the center of the display screen when confirming the fluoroscopic image while rotating (also called a "fixed point") (see symbol P in FIG. 15) is located in the center of the group of cross-sectional images. That is, the plane corresponding to the focus point height is located in the center of the group of cross-sectional images. Therefore, the operator confirms the position of the fixed point in the fluoroscopic image while rotating the work and adjusts the position or the like of the stage when photographing while mentally imagining the region to be outputted as the group of cross-sectional images after CT. In a conventional apparatus, it was only possible to determine the focus point height from a fluoroscopic image.

PRIOR ART DOCUMENT

Patent Document (Patent Document 1)
Japanese Unexamined Patent Application Publication 2014-139533

SUMMARY OF THE INVENTION

Problem to be Solved by the Invention

However, in an oblique CT apparatus, there is a problem in that it is often difficult to adjust the imaging position so that the portion to be viewed is outputted as a cross-sectional image. In particular, in the adjustment of the focus point height, it is difficult to discern the focus point height from a fluoroscopic image, so skill is required for imaging. In addition, in the determination of the focus point height from a fluoroscopic image, there is also a problem in that the precision is not improved substantially, and that, depending on the work, the value of the focus point height can be determined only to a precision of from a few hundred μm to around 1 mm. When it is desirable to perform CT imaging with a narrow field size of around a few mm, it is necessary to adjust the focus point height at a precision of around 100 μm, and in this case even a skilled parson may need to repeat a process of trial and error involving imaging while changing the focus point height multiple times.

In addition, in order to search for a fixed point for determining the focus point height on a fluoroscopic image, a characteristic portion serving as a mark must be present in the work, or a marker serving as a mark must be embedded in the work. However, such a characteristic portion is not always present in the work. For example, there are also cases in which a characteristic portion cannot be found in the work, as in the case of a work in which structures similar in shape such as fibers are disposed in a complex manner, and in such cases there is a problem in that it is difficult to make adjustments in the height direction.

The present invention was conceived in light of such circumstances, and an object thereof is to provide an oblique CT apparatus with which CT imaging can be performed efficiently without requiring skill and without repeating a process of trial and error involving performing CT imaging while changing the CT imaging conditions.

Means for Solving the Problem

In order to achieve such an object, the present invention assumes the following configuration.

Specifically, the oblique CT apparatus of the present invention is an oblique CT apparatus comprising: a radiation source for irradiating radiation, light, electromagnetic waves, an electron beam, or a neutron beam; a detector for detecting the radiation, light, electromagnetic waves, electron beam, or neutron beam; and a stage for mounting an object; the radiation source, the detector, and the stage being respectively disposed so that a rotational axis around which at least one of the radiation source, the detector, or the object is driven to rotate and an irradiation axis connecting the centers of the radiation source and the detector intersect orthogonally; and the oblique CT apparatus being configured to perform CT imaging based on a projection image obtained by detecting radiation, light, electromagnetic waves, an electron beam, or a neutron beam irradiated from the radiation source and passing through the object in a state in which at least one of the radiation source, the detector, or the stage is driven; wherein the oblique CT apparatus further comprises: a captured image processor processing a captured image for obtaining a cross-sectional image by CT imaging; an image storage storing a group of cross-sectional images captured by CT imaging in a wider field than that of main imaging or a group of cross-sectional images captured by CT imaging in main imaging; an image display for displaying a group of cross-sectional images captured by CT imaging in a wider field than that of main imaging; an image selector selecting a specific cross-sectional image from the group of cross-sectional images displayed by the image display; an imaging condition setter setting CT imaging conditions so that the cross-sectional image is in the center by selecting the specific cross-sectional image with the image selection means; and an imaging control means for setting and controlling at least one of the radiation source, the detector, or the stage based on the CT imaging conditions set by the imaging condition setter.

With the oblique CT apparatus of the present invention, the radiation source, the detector, and the stage are respectively disposed so that the rotational axis around which at least one of the radiation source, the detector, or the object is driven to rotate and the irradiation axis connecting the centers of the radiation source and the detector intersect orthogonally, and oblique CT imaging is performed in a state in which at least one of the radiation source, the detector, or the stage is driven. CT imaging in a wider view than that of main imaging (called "provisional CT imaging" hereafter) is performed in advance prior to main imaging. The group of cross-sectional images captured by provisional CT imaging is written and stored in the image storage, and is then read out from the image storage and displayed on the image display at the time of the setting of the CT imaging conditions for actual main imaging. Next, a specific cross-sectional image in which an area that the operator would like to view appears is selected with the image selector from the group of cross-sectional images (resulting from provisional CT imaging) displayed by the image display. By selecting the specific cross-sectional image with the image selector, CT imaging conditions are set with the imaging condition setter so that the cross-sectional image is positioned in the center, and main imaging is performed by setting and controlling at least one of the radiation source, the detector, or the stage based on the CT imaging conditions set by the imaging condition setter means. In contrast to a conventional technique of determining a specific cross-sectional image (for example, a cross-sectional image at the focus point height) from a fluoroscopic image, this can be assessed from the group of cross-sectional images in the present invention, so even an unskilled person can determine a specific cross-sectional image (for example, a cross-sectional image at the focus point height) with high precision and can further determine the CT imaging conditions (so that the cross-sectional image is positioned in the center). In addition, by performing main imaging by narrowing the target field from provisional CT imaging, CT imaging can be performed without the portion to be viewed deviating from the field of view. As a result, the operator can perform CT imaging without repeating a process of trial and error involving performing CT imaging while changing the CT imaging conditions, and CT imaging can be performed efficiently without requiring skill.

In the oblique CT apparatus of the present invention described above, a height display for displaying the height of each member of the group of cross-sectional images is provided, and the height of the specific cross-sectional image selected by the image selector is displayed by the height display. The operator can confirm the (numerical value of) the height of each member of the group of cross-sectional images with the height display and, in particular, can confirm the (numerical value of) the height of the specific cross-sectional image selected by the image selector means.

One example of a mode of imaging in the oblique CT apparatus of the inventions described above is to provide a region selector selecting a specific region in the specific cross-sectional image selected by the image selector, and for the CT imaging condition setter to set the CT imaging conditions so that the field is narrowed to the specific region selected by the region selector. The setting for selecting a specific region in the cross-sectional image is also called "thrust setting," and imaging performed by setting the CT imaging conditions so that the field is narrowed to a selected specific region is also called "thrust imaging." That is, a method of performing thrust setting simultaneously for the field size as well may also be considered in addition to the height (focus point height) of the specific cross-sectional image described above. In this case, when a specific region in the cross-sectional image (that is, the region subjected to thrust imaging) is selected after the specific cross-sectional image is selected, thrust imaging is performed at the field size of the selected region and with the setting of the CT imaging conditions so that the selected cross-sectional image is positioned in the center.

Effect of the Invention

With the oblique CT apparatus of the present invention, images can be assessed from a group of cross-sectional images (resulting from provisional CT imaging), so even an unskilled person can determine a specific cross-sectional image (for example, a cross-sectional image at the focus point height) with high precision and can further determine the CT imaging conditions (so that the cross-sectional image is positioned in the center). In addition, by performing main imaging by narrowing the target field from provisional CT imaging, CT imaging can be performed without the portion to be viewed deviating from the field of view. As a result, the operator can perform CT imaging without repeating a process of trial and error involving performing CT imaging while changing the CT imaging conditions, and CT imaging can be performed efficiently without requiring skill.

MODES FOR CARRYING OUT THE INVENTION

Embodiments

Figure 1:
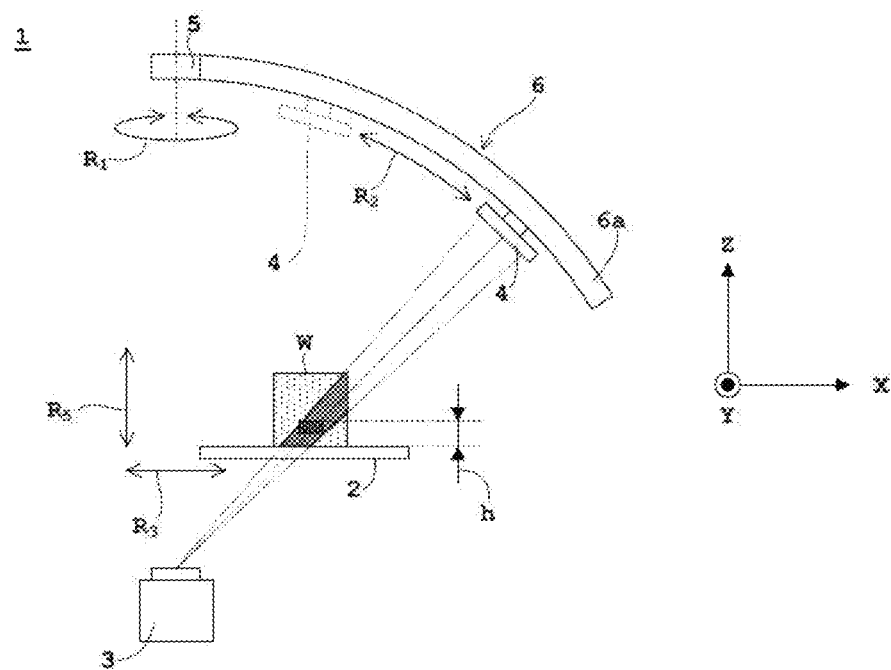
FIG. 1 is a schematic block diagram of an X-ray CT apparatus according to an embodiment.
Figure 2:
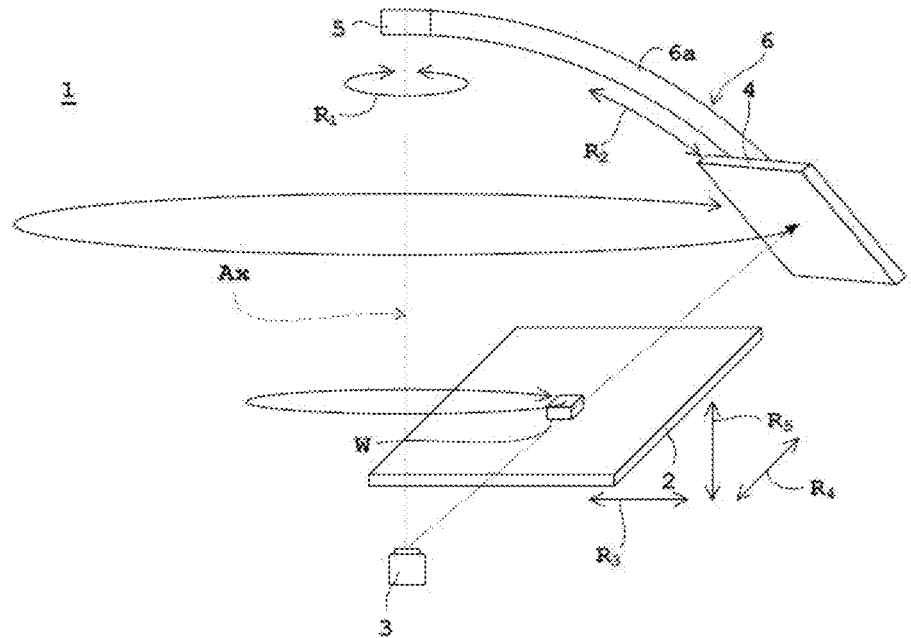
FIG. 2 is a schematic perspective view of an X-ray CT apparatus according to an embodiment.
Figure 3:
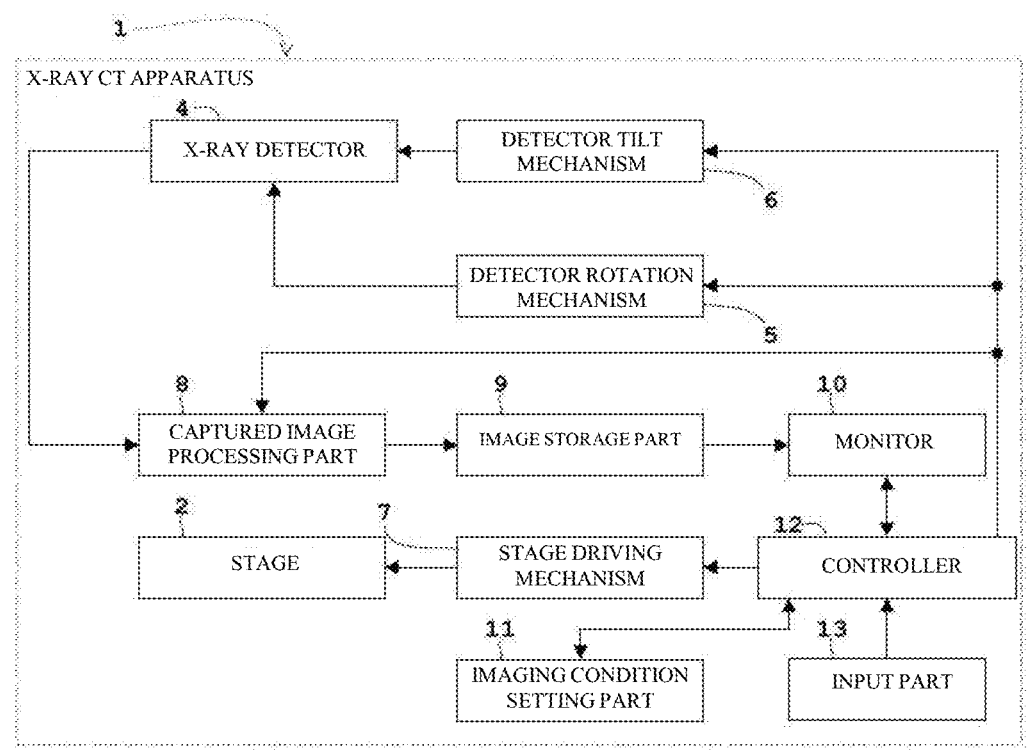
FIG. 3 is a block diagram of an X-ray CT apparatus according to an embodiment.

Embodiments of the present invention will be described hereinafter with reference to the drawings. FIG. 1 is a schematic block diagram of an X-ray CT apparatus according to an embodiment. FIG. 2 is a schematic perspective view of an X-ray CT apparatus according to an embodiment. FIG. 3 is a block diagram of an X-ray CT apparatus according to an embodiment. In this embodiment, an X-ray CT apparatus will be described as an example of an X-ray CT apparatus, and a micro-focus X-ray CT apparatus capable of observing the three-dimensional structure inside an object (work) at high magnification will be described as an example of an X-ray CT apparatus.

As illustrated in FIG. 18, an X-ray CT apparatus 1 includes a stage 2 on which a work W is mounted, and an X-ray tube 3 and an X-ray detector 4 disposed facing one another so as to sandwich the stage 2 there between. The X-ray detector 4 is not particularly limited and may be, for example, an image intensifier (I. I.), a flat panel X-ray detector (FPD: Flat Panel Detector), or the like. In this embodiment, a flat panel X-ray detector (FPD) will be described as an example of the X-ray detector 4. The stage 2 corresponds to the stage of the present invention. The X-ray tube 3 corresponds to the radiation source of the present invention. The X-ray detector 4 corresponds to the detector of the present invention.

The FPD includes a plurality of detection elements arranged in a matrix in correspondence with pixels. The detection pixels detect X-rays and output data of the detected X-rays (charge signal) as an X-ray detection signal. In this way, the X-ray detector 4 consisting of an FPD detects X-rays irradiated from the X-ray tube 3 and passing through the work W, outputs an X-ray detection signal, and arranges each of the pixel values based on the X-ray detection signal in accordance with the pixels so as to obtain a projection image (fluoroscopic image) projected on the detection surface of the X-ray detector 4.

In addition, as illustrated in FIG. 1, the X-ray CT apparatus 1 includes a detector rotation mechanism 5 for driving the X-ray detector 4 to rotate around arrow $R_1$, and a detector tilt mechanism 6 for tilting the X-ray detector 4 in the direction of arrow $R_2$. The detector tilt mechanism 6 includes an arc-shaped guide part 6a which supports the X-ray detector 4, and a rotary motor (not illustrated), and the rotary motor is driven to rotate so that the X-ray detector 4 is tilted in the direction of arrow $R_2$ along the guide part 6a.

The detector rotation mechanism 5 includes a rotary motor (not illustrated), and the rotary motor drives the guide part 6a of the detector tilt mechanism 6 to rotate around arrow $R_1$ so that the X-ray detector 4 supported on the guide part 6a is also driven to rotate around arrow $R_1$. In addition, in this embodiment, the rotational driving of the X-ray detector 4 by the detector rotation mechanism 5 and the linear driving of the stage 2 by a stage driving mechanism 7 described below (see FIG. 3) are controlled in synchronization with one another. In particular, the detector rotation mechanism 5 drives the X-ray detector 4 to rotate around arrow $R_1$ so that X-rays irradiated from the X-ray tube 3 pass through a fixed point of the work W and are detected in the central portion of the X-ray detector 4.

In this embodiment, the X-ray tube 3 is fixed to an apparatus case (not illustrated), and X-rays irradiated over a wide range from the X-ray tube 3 pass through a fixed point of the work W and are detected by the X-ray detector 4.

In addition, as illustrated in FIG. 3, the X-ray CT apparatus 1 includes a stage driving mechanism 7 for driving the stage 2 linearly in the directions of arrows $R_3$, $R_4$, and $R_5$ (see FIGS. 1 and 2) in the rectangular coordinate system X, Y, and Z (see FIG. 1), a captured image processing part 8 for processing a captured image for which a cross-sectional image is obtained by CT imaging, an image storage part 9 for writing and storing a group of cross-sectional images captured by CT imaging in a wider field than that of main imaging (provisional CT imaging) or a group of cross-sectional images captured by CT imaging in main imaging, a monitor 10 for displaying the group of cross-sectional images captured by CT imaging in a wider field than that of main imaging (provisional CT imaging), an imaging condition setting part 11 for allowing an operator to set CT imaging conditions so that a cross-sectional image is located in the center by selecting a specific cross-sectional image, a controller 12 for administering overall control over these components, and an input part 13 for allowing an operator to input data or commands. The captured image processing part 8 corresponds to the captured image processor of the present invention. The image storage part 9 corresponds to the image storage of the present invention. The monitor 10 corresponds to the image display and the height display of the present invention. The imaging condition setting part 11 corresponds to the imaging condition setter of the present invention. The controller 12 corresponds to the imaging controller of the present invention. The input part 13 corresponds to the image selector and the region selector of the present invention.

The stage driving mechanism 7 includes an X-axis linear motor (not illustrated) for driving the stage 2 linearly (horizontal driving in this case) in the direction of arrow $R_3$ (see FIGS. 1 and 2) parallel to X (see FIG. 1), a Y-axis linear motor (not illustrated) for driving the stage 2 linearly (horizontal driving in this case) in the direction of arrow $R_4$ (see FIG. 2) parallel to Y (see FIG. 1), and a X-axis linear motor (not illustrated) for driving the stage 2 linearly (vertical driving in this case) in the direction of arrow $R_5$ (see FIGS. 1 and 2) parallel to Z (see FIG. 1).

In this embodiment, the detector rotation mechanism 5 drives the X-ray detector 4 to rotate around arrow $R_1$ (see FIGS. 1 and 2), and thereby drives the X-ray detector 4 to rotate so that the X-ray detector 4 moves in a circular path around a rotational axis Ax (see FIG. 2) for driving the rotation of the work W (see FIGS. 1 and 2). In addition, the controller 12 controls the stage driving mechanism 7 so that the combination of the paths determined by each of the X-axis linear motor and the Y-axis linear motor results in a circular path consisting of concentric circles of the circular path of the X-ray detector 4 (that is, a circular path sharing the same rotational axis Ax in the circular path of the X-ray detector 4). In this way, the orientation of the stage 2 can be fixed to a constant orientation by driving the X-ray detector 4 to rotate while driving the stage 2 over the circular path.

Note that at least any one of the radiation source, the detector, or the stage may be driven, and in this embodiment, the X-ray detector 4 as a detector and the stage 2 are respectively driven. The detector rotation mechanism 5, the detector tilt mechanism 6, or the stage driving mechanism 7 is provided as a driving means for respectively driving the X-ray detector 4 and the stage 2. In addition, as illustrated in FIG. 2, the X-ray tube 3, the X-ray detector 4, and the stage 2 are respectively disposed so that the rotational axis Ax for driving the work W to rotate as an object and an irradiation axis (optical axis) connecting the centers of the X-ray tube 3 and the X-ray detector 4 as a radiation source intersect obliquely. CT imaging is performed based on a projection image (fluoroscopic image) obtained by detecting the X-rays passing irradiated from the X-ray tube 3 and passing through the work W with the X-ray detector 4 in a state in which the X-ray detector 4 and the stage 2 are respectively driven.

Returning to the explanation of FIG. 3, the captured image processing part 8 processes the captured image for which a cross-sectional image is obtained by CT imaging based on the projection image (fluoroscopic image). The processing of the captured image is not particularly limited and may be image reconstruction processing such as Filtered Back Projection (FBP) or iterative approximation. As described above, CT imaging is divided into main imaging and provisional CT imaging, which is CT imaging in a wider field than that of the preceding main imaging. In provisional CT imaging, the group of cross-sectional images obtained by the captured image processing part 8 is written and stored in the image storage part 9, and in main imaging, the group of cross-sectional images obtained by the captured image processing part 8 is written and stored in the image storage part 9. The image storage part 9 is made of a storage medium such as RAM (Random Access Memory).

At the time of the setting of the CT imaging conditions for actual main imaging, the group of cross-sectional images captured by provisional CT imaging is read out from the image storage part 9 and displayed on the monitor 10. The display mode of the monitor 10 will be described in detail below.

The input part 13 feeds data or commands inputted by the operator to the controller 12. The input part 13 is made of a pointer device such as a mouse, a keyboard, a joystick, a trackball, or a touch panel.

By inputting information into the input part 13, the operator can make an image selection for selecting a specific image from the group of cross-sectional images displayed on the monitor 10 or a region selection for selecting a specific region in the selected specific cross-sectional image via the controller 12. The image selection or region selection made with the input part 13 will be described in detail below.

When the operator selects a specific cross-sectional image by inputting information into the input part 13, the imaging condition setting part 11 sets the CT imaging conditions so that the cross-sectional image is located in the center. The controller 12 administers overall control over each portion constituting the X-ray CT apparatus 1. In particular, the controller 12 performs imaging control to respectively control the rotary motor of the detector rotation mechanism 5 (not illustrated), the rotary motor of the detector tilt mechanism 6 (not illustrated), and the X-axis/Y-axis/Z-axis linear motors of the stage driving mechanism 7 (not illustrated).

The captured image processing part 8, the imaging condition setting part 11, or the controller 12 described above consists of a central processing unit (CPU). Note that the captured image processing part 8 may also consist of a GPU (Graphics Processing Unit).

Figure 4:
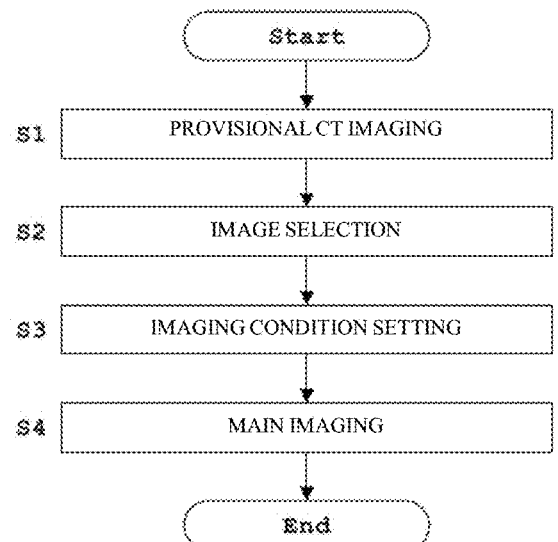
FIG. 4 is a flow chart illustrating a series of processes for imaging condition setting including provisional CT imaging, image selection, or main imaging.
Figure 5:
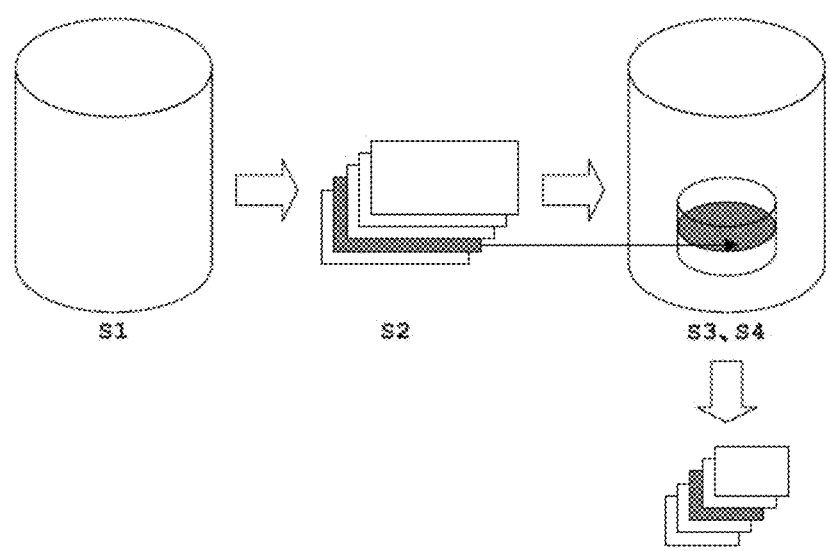
FIG. 5 is a schematic view related to imaging condition setting including provisional CT imaging, image selection, or main imaging.
Figure 6:
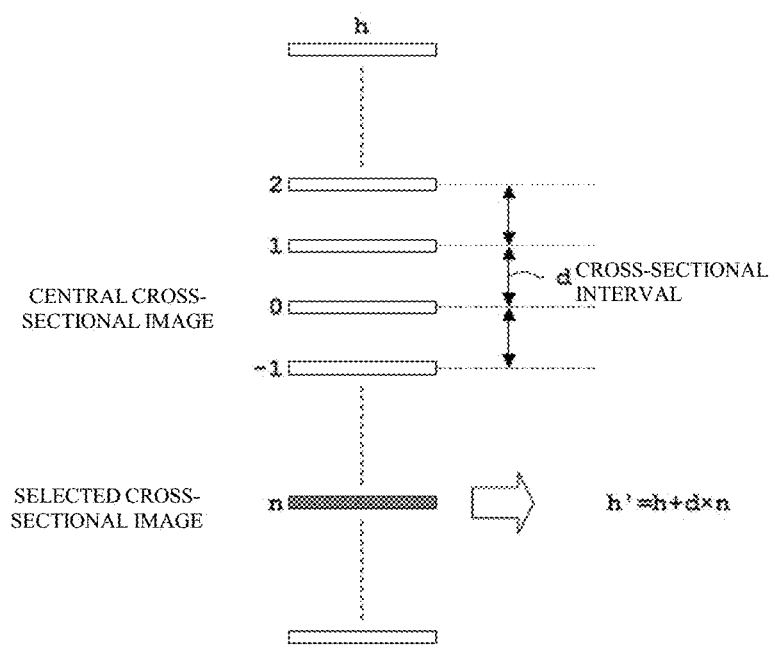
FIG. 6 is a schematic view related to the calculation of a focus point height for ensuring that a selected cross section is a center cross section.
Figure 7:
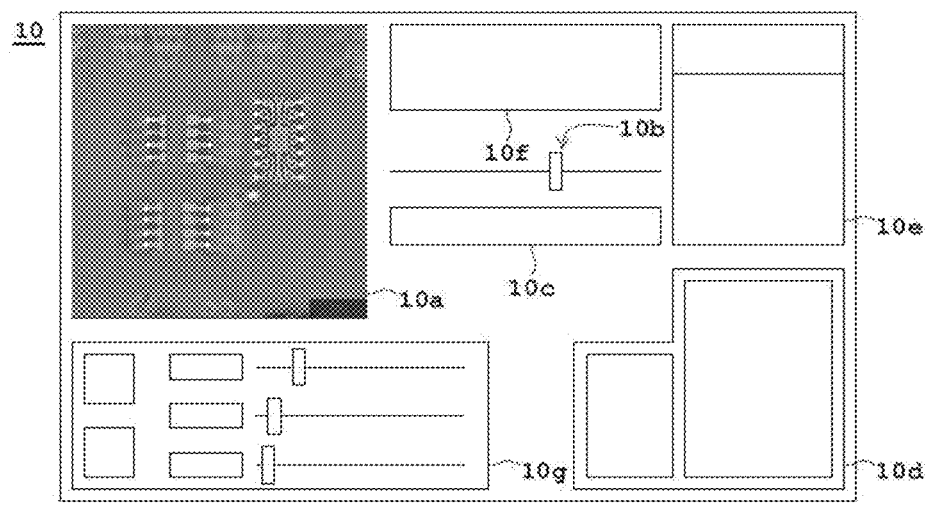
FIG. 7 is a mode of a monitor according to an embodiment.
Figure 8:
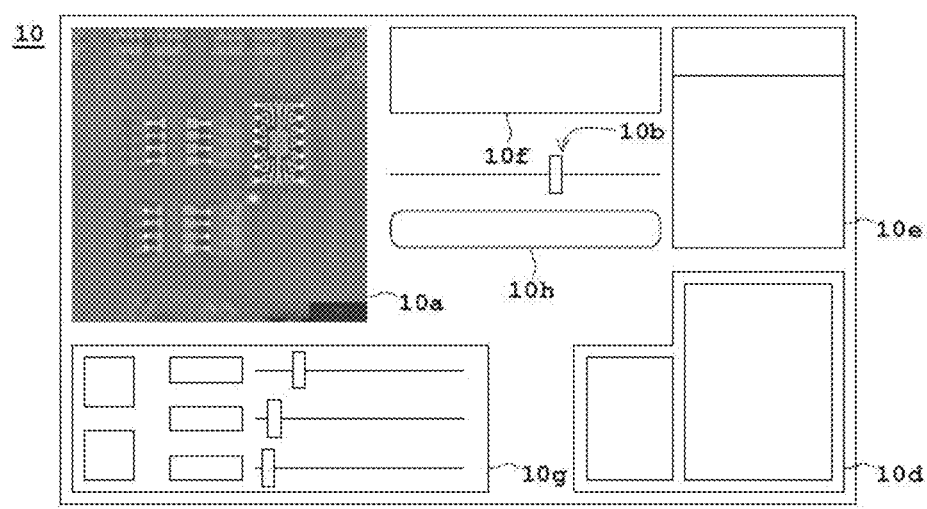
FIG. 8 is a mode of a monitor according to an embodiment other than that of FIG. 7.
Figure 9:
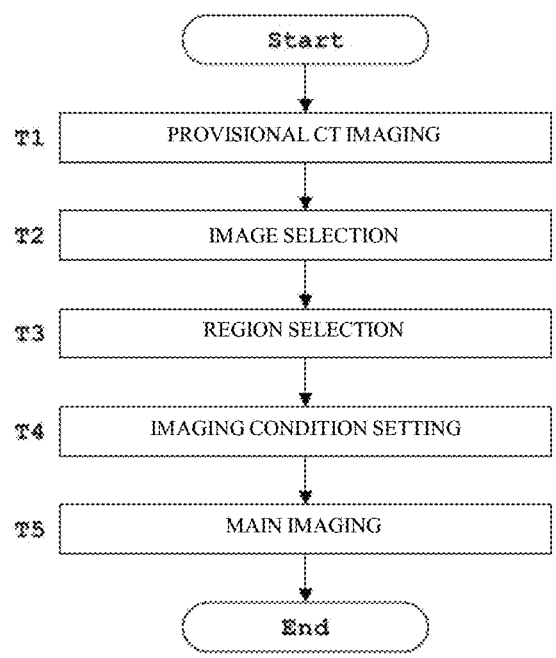
FIG. 9 is a flow chart illustrating a series of processes for imaging condition setting including provisional CT imaging, image selection, thrust setting, or main imaging (thrust imaging).
Figure 10:
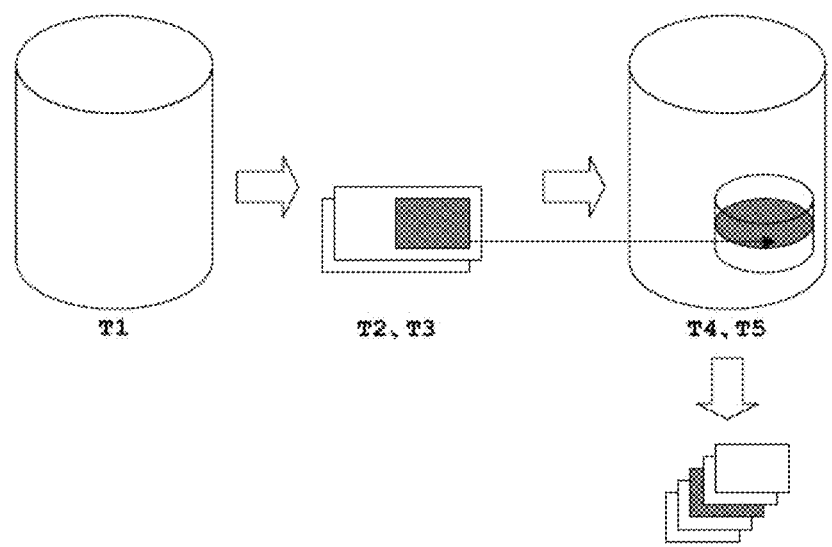
FIG. 10 is a schematic view related to imaging condition setting including provisional CT imaging, image selection, thrust setting, or main imaging (thrust imaging).
Figure 11:
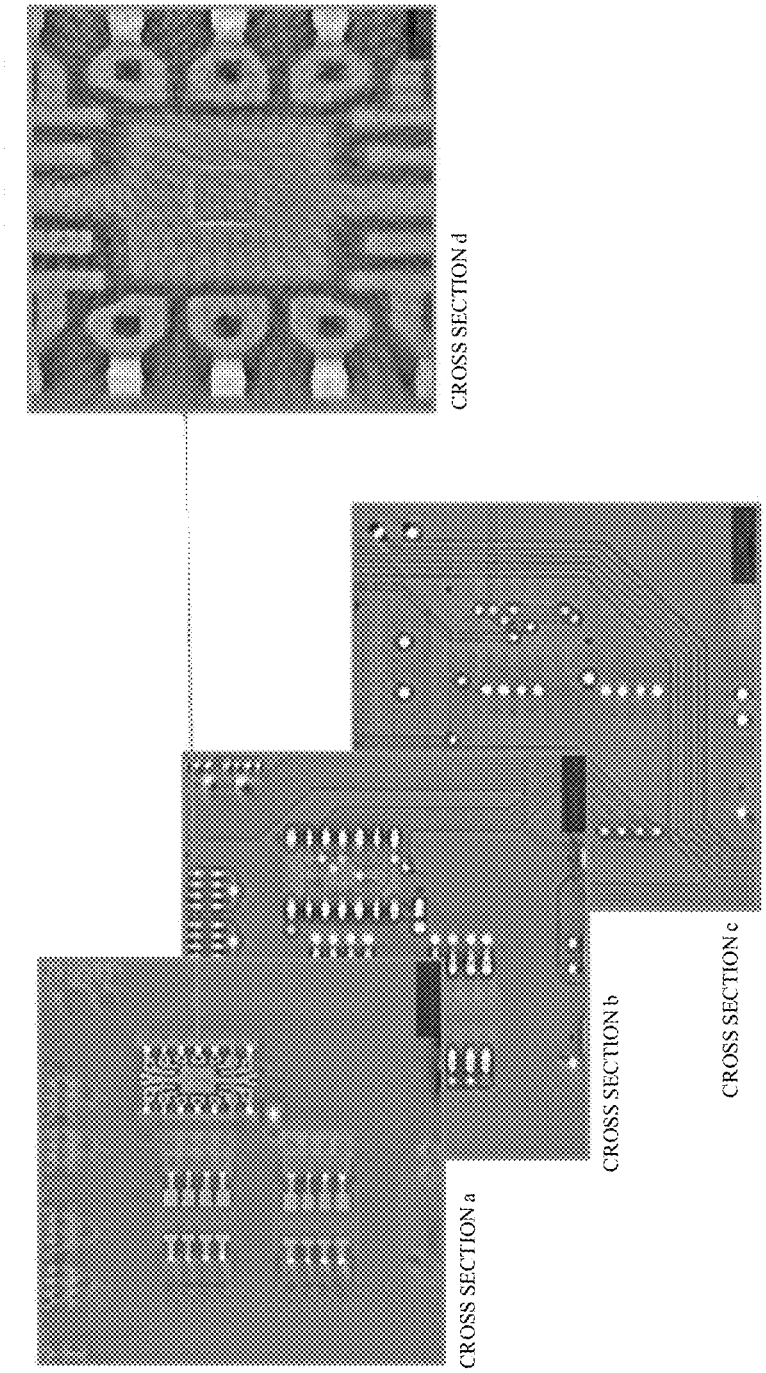
FIG. 11 is a schematic view of an image related to thrust setting or main imaging (thrust imaging).
Figure 12:
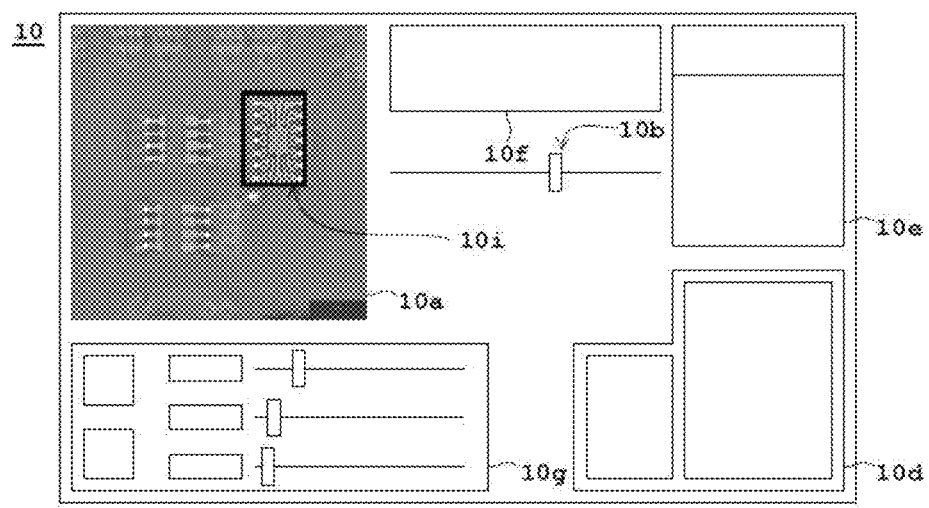
FIG. 12 is a mode of a monitor related to thrust setting.

Next, imaging condition setting including provisional CT imaging, image selection, or main imaging, the display mode of the monitor 10, and image selection or region selection with the input part 13 will be described with reference to FIGS. 4 to 12. FIG. 4 is a flowchart illustrating a series of processes for imaging condition setting including provisional CT imaging, image selection, or main imaging. FIG. 5 is a schematic view related to imaging condition setting including provisional CT imaging, image selection, or main imaging. FIG. 6 is a schematic view related to the calculation of a focus point height for ensuring that the selected cross section is a central cross section. FIG. 7 is a mode of a monitor according to an embodiment. FIG. 8 is a mode of a monitor according to an embodiment other than that of FIG. 7. FIG. 9 is a flow chart illustrating a series of processes for imaging condition setting including provisional CT imaging, image selection, thrust setting, or main imaging (thrust imaging). FIG. 10 is a schematic view related to imaging condition setting including provisional CT imaging, image selection, thrust setting, or main imaging (thrust imaging). FIG. 11 is a schematic view of an image related to thrust setting or main imaging (thrust imaging). FIG. 12 is a mode of a monitor related to thrust setting.

When thrust setting or thrust imaging is not performed, processing such as that shown in the flowchart of FIG. 4 or FIG. 5 is performed.

(Step S1) Provisional Imaging

First, provisional imaging, which is CT imaging over a wider field than that of the main imaging of step S4, is performed prior to the main imaging of step S4. To broaden the field to be wider than that of main imaging, the provisional CT imaging is performed by irradiating X-rays from the X-ray tube 3 in a state in which the X-ray tube 3 (see FIGS. 1 and 2) is positioned at a distance from the stage 2 (see FIGS. 1 to 3). At this time, the field is wide, so the precision required for the focus point height is low, and the value thereof may be determined approximately from the projection image (fluoroscopic image) of a conventional method.

Simultaneously with main imaging, the X-ray tube 3, the X-ray detector 4 (see FIGS. 1 to 3), and the stage 2 are respectively disposed so that the rotational axis Ax (see FIG. 2) and the irradiation axis (optical axis) intersect orthogonally, and X-rays are irradiated from the X-ray tube 3 in a state in which the X-ray detector 4 and the stage 2 are respectively driven. The captured image processing part 8 (see FIG. 3) then processes the captured image for which a cross-sectional image is obtained by CT imaging based on a projection image (fluoroscopic image) obtained by detecting the X-rays irradiated from the X-ray tube 3 and passing through the work W (see FIGS. 1 and 2) with the X-ray detector 4. The group of cross-sectional images obtained by the captured image processing part 8 in provisional CT imaging is written and stored in the image storage part 9 (see FIG. 3).

(Step S2) Image Selection

A the time of the setting of the CT imaging conditions for actual main imaging, the group of cross-sectional images captured by provisional CT imaging is read out from the image storage part 9 and displayed on the monitor 10 (see FIG. 3). The operator uses the input part 13 (see FIG. 3) to select a specific cross-sectional image in which the desired portion appears from the group of cross-sectional images displayed on the monitor 10. An example of a specific mode of display on the monitor 10 is the display mode illustrated in FIG. 7 or the display mode illustrated in FIG. 8.

(Display Mode Illustrated in FIG. 7)

As illustrated in FIG. 7, the monitor 10 respectively includes an image display screen 10a for displaying one cross-sectional image from the group of cross-sectional images, a slider 10b for setting a specific cross section from among the group of cross-sectional images by means of a slide operation, a height display part 10c for displaying the (numerical value of the) height of each member of the group of cross-sectional images, and an imaging condition display setting part 10d for displaying the CT imaging conditions set by the imaging condition setting part 11 (see FIG. 3) and once again setting the CT imaging conditions if the field of view or the angle formed by the rotational axis Ax and the irradiation axis (optical axis) (also called the "lamino angle"), for example, has been changed. In addition, the monitor may also respectively include an appearance display part 10e for displaying the appearance of the work W, a provisional CT imaging information display part 10f for displaying information related to provisional CT imaging (for example, the imaging time, the tube current, the tube voltage, the field of view, the lamino angle, or the like), or an image quality adjustment part 10g for adjusting the image quality of the cross-sectional image displayed by the image display screen 10a.

In practice, the slider 10b is operated by means of a slide operation to search for a cross-sectional image of the desired portion and to designate the cross-sectional image as a specific cross-sectional image. For example, by aligning the pointer of a mouse of the input part 13 with the slider 10b and dragging the pointer to set the pointer at a given position, the slider 10b is subjected to a slide operation to that position by the input part 13. In this way, the height of a given cross-sectional image is set with the slider 10b by performing a slide operation on the slider 10b. By setting the height of a given cross-sectional image with the slider 10b, the height is displayed by the height display part 10c, and a cross-sectional image at that height is displayed by the image display screen 10a. In this way, this height and the cross-sectional image at this height can be reflected on the height display part 10c and the image display screen 10a and confirmed.

In this way, when the operator performs the slide operation at a position matching the height of a given cross-sectional image (at a desired position) with the input part 13, that cross-sectional image is displayed by the image display screen 10a as a specific cross-sectional image, and the (numerical value of the) height of that cross-sectional image is displayed by the height display part 10c. CT imaging, which is main imaging, can then be performed by setting the CT imaging conditions so that the portion to be viewed is located in the center. This height serves as the focus point height (also called the "tracking point").

Note that the selection of a specific cross-sectional image is not limited to the slide operation of the slider described above. For example, a specific cross-sectional image may also be selected by inputting an integer as an index from 1 to n (see 1 to n in FIG. 6) of the cross-sectional image (n is the total number of tomographic sectional images).

(Display Mode Illustrated in FIG. 8)

The present invention is not limited to the display mode illustrated in FIG. 7. For example, as illustrated in FIG. 8, the monitor 10 is provided with the same image display screen 10a, slider 10b, imaging condition display setting part 10d, appearance display part 10e, provisional CT imaging information display part 10f, or image quality adjustment part 10g as in FIG. 7, and is further provided with a setting button 10h for determining a set (present) cross-sectional image as a specific cross-sectional image and setting the CT imaging conditions so that the determined cross-sectional image is located in the center.

To determine a specific cross-sectional image with the setting button 10h, the pointer of a mouse is aligned with the setting button 10h and clicked, for example, to determine a specific cross-sectional image with the input part 13. When the setting button 10h is clicked (depressed), the parameters for the focus point height (tracking point) at which the currently selected cross-sectional image is located in the center are set automatically by the imaging condition setting part 11, which makes it possible to achieve the same effect as in the display mode illustrated in FIG. 7.

(Step S3) Imaging Condition Setting

When the operator selects a specific cross-sectional image (see the gray color in FIG. 5) with the image selection of step S2, the CT imaging conditions are set so that the cross-sectional image is located in the center. Specifically, as illustrated in FIG. 6, the focus point height at the time of provisional CT imaging over a wide view is defined as h (see FIG. 1 as well); the cross-sectional interval is defined as d; the index of the central cross-sectional image at the time of provisional CT imaging is defined as "0th"; the index of the selected specific cross-sectional image (indicated as the "selected cross-sectional image" in FIG. 6) is defined as "nth"; and the focus point height at which the cross-sectional image is located in the center is defined as h'. As a result, h' is expressed by the following formula (1) when the focus point height h at the time of provisional CT imaging, the number (index) n from the central cross-sectional image at the time of provisional CT imaging, and the cross-sectional interval d are used.

$$h' = h + d \times n \quad (1)$$

The focus point height h' at which the selected cross-sectional image is in the center is determined by this formula (1), and a geometric calculation is performed based on the focus point height h' to select CT imaging conditions so that the selected cross-sectional image is located in the center.

Note that to change the field of view or the lamino angle, the field of view or the lamino angle to be changed may be inputted and set with the imaging condition display setting part 10d (see FIG. 7 or 8. In addition to the focus point height h', the geometrical computation may be performed based on the field of view or the lamino angle changed by the imaging condition display setting part 10d so that the CT imaging conditions under which the selected cross-sectional image is located in the center are set once again.

(Step S4) Main Imaging

The field of view is narrowed (see the gray color in FIG. 5) to be narrower than in provisional CT imaging, and the controller 12 (see FIG. 3) sets and controls at least one of the X-ray tube 3 as a radiation source, the X-ray detector 4 as a detector, or the stage 2 based on the CT imaging conditions set by imaging condition setting in step S3. In this embodiment, the X-ray detector 4 and the stage 2 are respectively set. To narrow the field of view to be narrower than in provisional CT imaging, the X-ray tube 3 is brought into close proximity to the stage 2, for example, and main imaging is performed by irradiating X-rays from the X-ray tube 3 in a state in which the X-ray tube 33 is fixed to the apparatus case (not illustrated) and in a state in which the X-ray detector 4 and the stage 2 are respectively set based on the CT imaging conditions.

Simultaneously with provisional CT imaging, in main imaging, the X-ray tube 3, the X-ray detector 4, and the stage 2 are respectively disposed so that the rotational axis Ax and the irradiation axis (optical axis) intersect obliquely, and X-rays are irradiated from the X-ray tube 3 in a state in which the X-ray detector 4 and the stage 2 are respectively driven. The captured image processing part 8 then processes the captured image for which a cross-sectional image is obtained by CT imaging based on a projection image (fluoroscopic image) obtained by detecting the X-rays irradiated from the X-ray tube 3 and passing through the work W with the X-ray detector 4. The group of cross-sectional images obtained by the captured image processing part 8 in main CT imaging is written and stored in the image storage part 9.

When performing thrust setting or thrust imaging, processing such as that illustrated in the flow chart of FIG. 9 or FIG. 10 or 11 is performed. Thrust setting is performed with the monitor 10 of the display mode illustrated in FIG. 12.

(Step T1) Provisional CT Imaging

This step is the same as the provisional CT imaging of step S1, so an explanation thereof will be omitted here.

(Step T2) Provisional CT Imaging

This step is the same as the provisional CT imaging of step S2, so an explanation thereof will be omitted here.

(Step T3) Region Selection

A specific region (see the gray color in FIG. 10 or "cross section d" in FIG. 11) is selected from the specific cross-sectional image (see "cross section a" in FIG. 11) selected in the image selection of step T2. As described in the "Means for Solving the Problem" section, the setting for selecting a specific region in the cross-sectional image is also called "thrust setting." The selected specific cross-sectional image is displayed on the monitor 10.

To select a specific region in the specific cross-sectional image displayed on the monitor 10, the pointer of a mouse of the input part 13 is aligned with a given point from the points of the four corners of the specific region and dragged, for example, to select a region enclosed by the dragging start point and end point (see symbol 10i in FIG. 12) as a specific region with the input part 13. When the coordinates of the four corners of the specific region are known, the region enclosed by the known coordinates may be selected as a specific region by the input part 13 by aligning the pointer of the mouse with the coordinate input part (not illustrated) of the monitor 10 to input the known coordinates. The parameters set here serve as the imaging field size (FOV: Field of View) and the imaging position (X, Y) in addition to the focus point height (tracking point).

(Step T4) Imaging Condition Setting

The imaging condition setting part 11 sets the CT imaging conditions so that the field of view is narrowed to the specific region selected by the region selection of step T3. When the cross section a is a selected cross-sectional image, as illustrated in FIG. 11, CT imaging conditions are set so that the cross section a is located in the center, and CT imaging conditions are set so that the field of view is narrowed to the specific region.

(Step T5) Main Imaging

The field of view is narrowed to the specific region (see the gray color in FIG. 10 or "cross section d" in FIG. 11), and the controller 12 performs main imaging by respectively setting the X-ray detector 4 and the stage 2 based on the CT imaging conditions set by the imaging condition setting of step T4. As described in the "Means for Solving the Problem" section above, the imaging performed by setting the CT imaging conditions so that the field of view is narrowed to the selected specific region is also called "thrust imaging."

In this way, thrust setting is performed simultaneously for the field of view size (FOV) in addition to the height (focus point height) of the specific cross-sectional image described above. In this case, when a specific region in the cross-sectional image (that is, the region subjected to thrust imaging) is selected after the specific cross-sectional image is selected, thrust imaging is performed at the field size of the selected region and with the setting of the CT imaging conditions so that the selected cross-sectional image is positioned in the center.

With the X-ray CT apparatus 1 according to this embodiment, the radiation source (X-ray tube 3), the detector (X-ray detector 4), and the stage 2 are respectively disposed so that the rotational axis Ax around which at least one of the radiation source (the X-ray tube 3 in this embodiment), the detector (the X-ray detector 4 in this embodiment), or the object (work W) (work W in this embodiment) is driven to rotate and the irradiation axis (optical axis) connecting the centers of the radiation source (X-ray tube 3) and the detector (X-ray detector 4) intersect obliquely, and oblique CT imaging is performed in a state in which at least one of the radiation source (X-ray tube 3), the detector (X-ray detector 4), or the stage 2 (the X-ray detector 4 and the stage 2 in this embodiment) is driven. CT imaging in a wider view than that of main imaging (provisional CT imaging) is performed in advance prior to main imaging. The group of cross-sectional images captured by provisional CT imaging is written and stored in the image storage (the image storage part 9 in this embodiment), and is then read out from the image storage (image storage part 9) and displayed on the image display (the monitor 10 in this embodiment) at the time of the setting of the CT imaging conditions for actual main imaging.

Next, a specific cross-sectional image in which an area that the operator would like to view appears is selected with the image selector (the input part 13 in this embodiment) from the group of cross-sectional images (resulting from provisional CT imaging) displayed by the image display (monitor 10). By selecting the specific cross-sectional image with the image selector (input part 13), CT imaging conditions are set with the imaging condition setter (the imaging condition setting part 11 in this embodiment) so that the cross-sectional image is positioned in the center, and main imaging is performed by setting and controlling at least one of the radiation source (X-ray tube 3), the detector (X-ray detector 4), or the stage 2 (the X-ray detector 4 and the stage 2) based on the CT imaging conditions set by the imaging condition setter (imaging condition setting part 11).

In contrast to a conventional technique of determining a specific cross-sectional image (for example, a cross-sectional image at the focus point height) from a fluoroscopic image, this can be assessed from the group of cross-sectional images in the present invention, so even an unskilled person can determine a specific cross-sectional image (for example, a cross-sectional image at the focus point height) with high precision and can further determine the CT imaging conditions (so that the cross-sectional image is positioned in the center). In addition, by performing main imaging by narrowing the target field from provisional CT imaging, CT imaging can be performed without the portion to be viewed deviating from the field of view. As a result, the operator can perform CT imaging without repeating a process of trial and error involving performing CT imaging while changing the CT imaging conditions, and CT imaging can be performed efficiently without requiring skill.

For example, even if the value of the focus point height can only be determined to a precision of from a few hundred μm to around 1 mm conventionally, the output interval of the group of cross-sectional images in the height direction (see the cross-sectional interval d in FIG. 6) is from around 1/500 to around 1/1,000 the field of view size in this embodiment, so the focus point height can be determined with very high precision using the technique of this embodiment.

At least one of the X-ray tube 3 as a radiation source, the X-ray detector 4 as a detector, or the stage 2 may be driven. Accordingly, in this embodiment, the apparatus is provided with the detector rotation mechanism 5, the detector tilt mechanism 6, or the stage driving mechanism 7 as a driving means for respectively driving the X-ray detector 4 and the stage 2 while maintaining a state in which the rotational axis Ax and the irradiation axis (optical axis) intersect obliquely.

In addition, when the apparatus is provided with the driving means (for respectively driving the X-ray detector 4 and the stage 2) described above (the detector rotation mechanism 5, the detector tilt mechanism 6, or the stage driving mechanism 7), the driving means is provided with a detector rotation mechanism 5 as a detector driving means for driving the X-ray detector 4 so that the X-ray detector 4 moves on a circular path, and a stage driving mechanism 7 as a stage driving means for respectively driving the stage 2 linearly in the direction of two prescribed axes (the direction of arrow $R_3$ parallel to X and the direction of arrow $R_4$ parallel to Y) of the rectangular coordinate system X, Y, and Z (see FIG. 1) so that the combined path determined by the linear driving in the two axial directions (the direction of arrow $R_3$ and the direction of arrow $R_4$) is a circular path consisting of concentric circles of the circular path of the X-ray detector 4. In addition, the rotational driving of the X-ray detector 4 by the detector rotation mechanism 5 and the linear driving of the stage 2 by the stage driving mechanism 7 are controlled in synchronization with one another.

By linearly driving the stage 2 in the two prescribed axial directions (the direction of arrow $R_3$ and the direction of arrow $R_4$) of the rectangular coordinate system X, Y, and Z, setting the combined path determined by linear driving in the two axial directions (the direction of arrow $R_3$ and the direction of arrow $R_4$) to be a circular path consisting of concentric circles of the circular path of the X-ray detector 4, and controlling the rotational driving of the X-ray detector 4 by the detector rotation mechanism 5 and the linear driving of the stage 2 by the stage driving mechanism 7 in synchronization with one another, a state that is relatively the same as one in which the object (work W) mounted on the stage 2 is rotating is created. In addition, a pseudo-rotation path is created by linear driving in two axial directions.

The present invention is not limited to the embodiment described above, and variations can be implemented as follows.

(1) In the embodiment described above, an X-ray CT apparatus was described as an example of a CT apparatus, but the present invention is not limited to X-rays as long as the apparatus is an oblique CT apparatus in which the radiation source, the detector, and the stage are respectively disposed so that the rotation axis for driving at least one of the radiation source, the detector, or the object to rotate and the irradiation axis connecting the centers of the radiation source and the detector intersect obliquely, wherein CT imaging is performed in a state in which at least one of the radiation source, the detector, or the stage is driven. The present invention may also be applied to an oblique CT apparatus for performing CT imaging based on a projection image obtained by detecting at least one type of radiation other than X-rays (α-rays, β-rays, γ-rays, or the like), light, electromagnetic waves, an electron beam, or a neutron beam irradiated from the radiation source and passing through the object using a detector.

(2) In the embodiment described above, the present invention was applied to a testing apparatus for industrial use or manufacturing using a micro-focus X-ray CT apparatus such as that illustrated in FIG. 1, but the present invention may also be applied to a medical apparatus in which the object is a specimen of a human or small animal.

Figure 13:
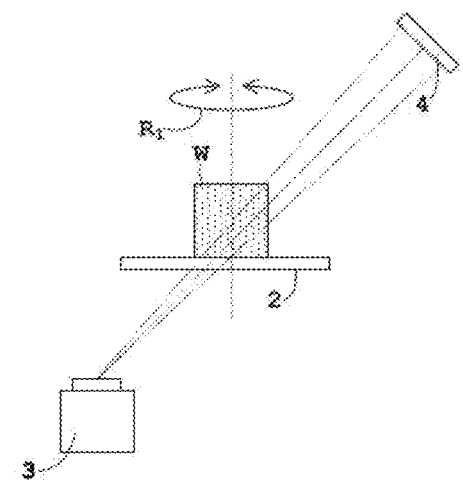
FIG. 13 is a schematic view of a mode of an X-ray CT apparatus according to a variation.
Figure 14:
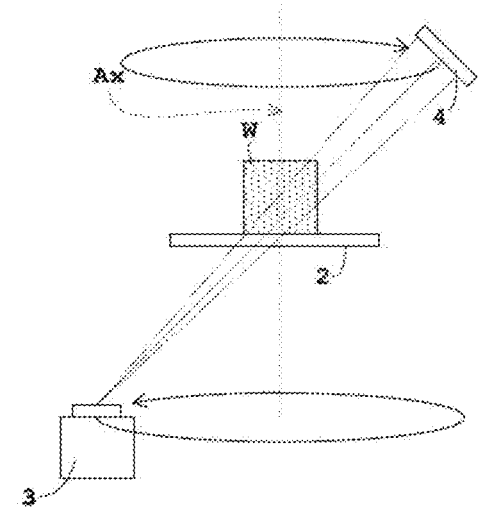
FIG. 14 is a schematic view of a mode of an X-ray CT apparatus according to another variation.
Figure 15:
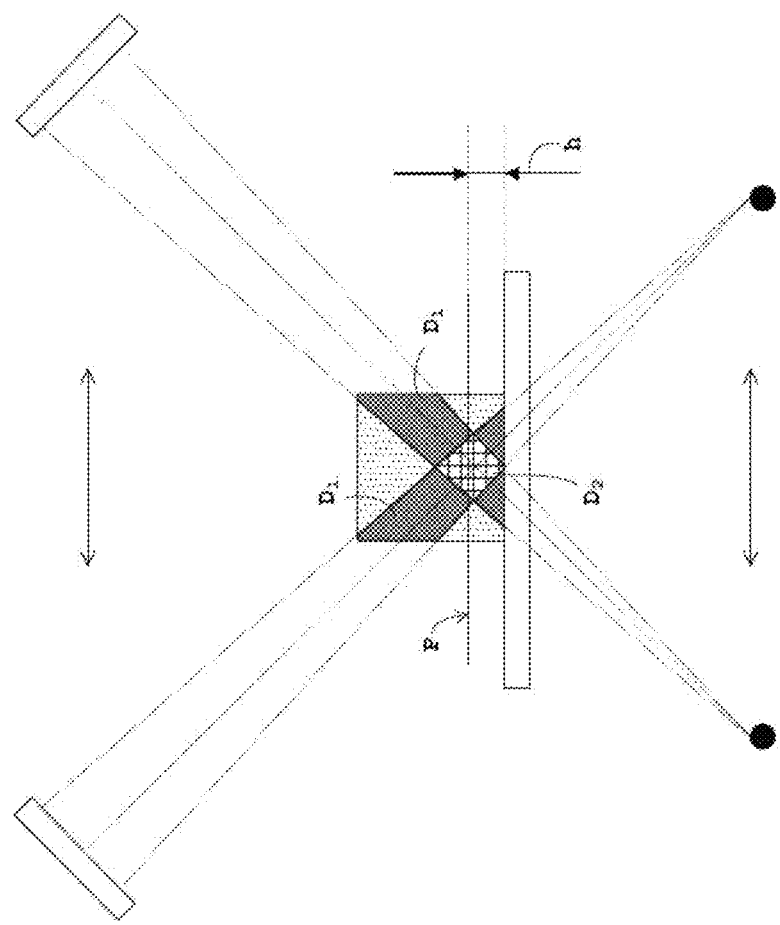
FIG. 15 is a schematic view for explaining the focus point height in oblique CT.

(3) In the embodiment described above, a mode in which the X-ray detector 4 and the stage 2 are respectively driven, as illustrated in FIGS. 1 and 2, was described, but the present invention is not particularly limited as long as the mode is one in which a radiation source (the X-ray tube 3 in the embodiment), a detector (the X-ray detector 4 in the embodiment), and the stage are respectively disposed so that the rotational axis and the irradiation axis (optical axis) intersect obliquely, and CT imaging is performed in a state in which at least one of the radiation source (X-ray tube 3), the detector (X-ray detector 4), or the stage is driven. For example, the present invention may be applied to a mode in which, as illustrated in FIG. 13, CT imaging is performed in a state in which a radiation source such as the X-ray tube 3 and a detector such as the X-ray detector 4 are fixed and only the stage 2 is driven to rotate around arrow $R_1$, or a mode in which, as illustrated in FIG. 14, CT imaging is performed in a state in which the stage 2 is fixed and a radiation source such as the X-ray tube 3 and a detector such as the X-ray detector 4 are driven to rotate around the rotational axis Ax. Note that in FIG. 13 or 14, an illustration of the detector rotation mechanism, the detector tilt mechanism, or the stage driving mechanism is omitted.

(4) In the embodiment described above, the image selection or region selection made with the input part 13 (see FIG. 3) was made by dragging and clicking with a mouse, but the input part 13 may be configured as a touch panel so that the monitor 10 serves the function of the input part 13 and the operator presses and operates the touch panel with a finger.

FIELD OF INDUSTRIAL APPLICATION

As described above, the present invention is suitable for an oblique CT apparatus using radiation, light, electromagnetic waves, an electron beam, a neutron beam, or the like such as a micro-focus X-ray CT apparatus.

EXPLANATION OF THE REFERENCES

1: X-ray CT apparatus
2: stage
3: X-ray tube
4: X-ray detector
5: detector rotation mechanism
6: detector tilt mechanism
7: stage driving mechanism
8: captured image processing part
9: image storage part
10: monitor
11: imaging condition setting part
12: controller
13: input part
h: focus point height
Ax: rotational axis
W: work

The invention claimed is:

1. An oblique CT apparatus comprising:
a radiation source for irradiating radiation, light, electromagnetic waves, an electron beam, or a neutron beam;
a detector for detecting the radiation, light, electromagnetic waves, electron beam, or neutron beam; and
a stage for mounting an object;
the radiation source, the detector, and the stage being respectively disposed so that a rotational axis around which at least one of the radiation source, the detector, or the object is driven to rotate and an irradiation axis connecting the centers of the radiation source and the detector intersect orthogonally; and
the oblique CT apparatus being configured to perform CT imaging based on a projection image obtained by detecting radiation, light, electromagnetic waves, an electron beam, or a neutron beam irradiated from the radiation source and passing through the object in a state in which at least one of the radiation source, the detector, or the stage is driven;
wherein the oblique CT apparatus further comprises:
a captured image processor processing a captured image for obtaining a cross-sectional image by CT imaging;
an image storage storing a group of cross-sectional images captured by CT imaging in a wider field than that of main imaging or a group of cross-sectional images captured by CT imaging in main imaging;
an image display displaying a group of cross-sectional images captured by CT imaging in a wider field than that of main imaging;
an image selector selecting a specific cross-sectional image from the group of cross-sectional images displayed by the image display;
an imaging condition setter setting CT imaging conditions so that the selected specific cross-sectional image with the image selector is in the center in a direction of a height of the cross-sectional image by selecting the specific cross-sectional image with the image selector; and
an imaging controller setting and controlling at least one of the radiation source, the detector, or the stage based on the CT imaging conditions set by the imaging condition setter, wherein
if a focus point height at the time of CT imaging in a wider field than that of main imaging is defined as h, the cross-sectional interval is defined as d, the index of the central cross-sectional image at the time of the CT imaging is defined as "Oth", and an index of the selected specific cross-sectional image with the image selector is defined as "nth", a focus point height h' at which the selected specific cross-sectional image is in the center is determined by the formula $h'=h+d \times n$, and
the imaging condition setter performs a geometric calculation based on the focus point height h' to select CT imaging conditions so that the selected specific cross-sectional image with the image selector is in the center in the direction of the height of the cross-sectional image.

2. The oblique CT apparatus according to claim 1 provided with:
a height display displaying a height of each member of the group of cross-sectional images;
wherein the height of the specific cross-sectional image selected by the image selection means is displayed by the height display.

3. The oblique CT apparatus according to claim 1 provided with:
a region selector selecting a specific region in the specific cross-sectional image selected by the image selector;
wherein the imaging condition setter sets the CT imaging conditions so that the field of view is narrowed to the specific region selected by the region selector.

* * * * *